United States Patent
Melen

[11] Patent Number: 6,151,423
[45] Date of Patent: Nov. 21, 2000

[54] CHARACTER RECOGNITION WITH DOCUMENT ORIENTATION DETERMINATION

[75] Inventor: Roger D. Melen, Los Altos Hills, Calif.

[73] Assignee: Canon Kabushiki Kaisha, Tokyo, Japan

[21] Appl. No.: 09/034,956

[22] Filed: Mar. 4, 1998

[51] Int. Cl.$^7$ .................................................. G06K 9/36
[52] U.S. Cl. ................................. 382/289; 382/297
[58] Field of Search ......................... 382/289, 290, 382/297, 182, 200, 291, 293, 296; 235/462

[56] References Cited

U.S. PATENT DOCUMENTS

| | | | |
|---|---|---|---|
| 5,034,733 | 7/1991 | Okazawa et al. | 382/297 |
| 5,038,393 | 8/1991 | Nanba | 382/61 |
| 5,046,116 | 9/1991 | Melen | 382/36 |
| 5,077,811 | 12/1991 | Onda | 382/46 |
| 5,235,651 | 8/1993 | Nafarieh | 382/297 |
| 5,257,323 | 10/1993 | Melen et al. | 382/39 |
| 5,301,036 | 4/1994 | Barrett et al. | 358/448 |
| 5,471,549 | 11/1995 | Kurosu et al. | 382/290 |
| 5,479,525 | 12/1995 | Nakamura et al. | 382/297 |
| 5,649,033 | 7/1997 | Morikawa et al. | 382/297 |
| 5,696,841 | 12/1997 | Nakatsuka | 382/174 |
| 5,880,451 | 3/1999 | Smith et al. | 235/462 |

FOREIGN PATENT DOCUMENTS

| | | | |
|---|---|---|---|
| 0 725 359 A1 | 8/1996 | European Pat. Off. | G06K 9/32 |
| 6-103410 | 4/1994 | Japan | G06K 9/32 |
| 9-69136 | 3/1997 | Japan | G06K 9/20 |

*Primary Examiner*—Bhavesh Mehta
*Assistant Examiner*—Kanji Patel
*Attorney, Agent, or Firm*—Fenwick & West LLP

[57] ABSTRACT

The correct orientation for a document scanned by an OCR system is determined from the confidence factors associated with multiple character images identified in the document. One disclosed orientation determination module (258) for determining the correct page orientation includes a confidence factor values buffer (402), a comparison module (404), a reference value buffer (406), a sort module (408), and a decision module (410). The orientation determination module (258) obtains arrays of confidence factor values that respectively correspond to first and second page orientations. The confidence factor values buffer (402) stores and indexes the confidence factor values, the sort module (408) sorts the values, and the reference value buffer (406) stores comparison information such as threshold levels. The comparison module (404) compares the first and second arrays of confidence factor values, such as by accessing selected values in the arrays, averaging such selected values, and determining whether and how many values exceed threshold levels. The decision module (410) determines the correct, or proper, document orientation.

14 Claims, 8 Drawing Sheets

CHARACTER RECOGNITION WITH DOCUMENT ORIENTATION DETERMINATION

TECHNICAL FIELD

This invention relates generally to optical character recognition and more particularly to determining the orientation of a scanned page.

BACKGROUND ART

Optical character recognition (OCR) systems convert images such as numerals, letters, and symbols into formats typically used by a computer. For example, an OCR system can scan a page having typed alphanumeric characters and produce ASCII codes corresponding to the characters. During a typical scan, image data, such as gray scale pixel data, for a document can be optically captured. Then image data for each character on the page can be processed to identify the characters and provide their corresponding character codes. The character codes can be passed to a computer application, such as a spreadsheet or word processing application, for further use.

One need in OCR is the ability to consistently obtain coherent data independent from the way in which the scanned subject is presented. For example, a user may input a page rotated 180 degrees from the expected input direction, which would cause the page to be scanned upside down. A conventional scanner will try to interpret the characters so scanned, without an efficient determination as to the orientation of the page.

There remains a need for an OCR system that automatically determines the orientation of a scanned page, particularly without adversely impacting scanning efficiency, and that incorporates correct orientation determination into scanning results.

DISCLOSURE OF INVENTION

The present invention provides apparatusses and methods for determining the correct page orientation for a scanned document, including but not limited to a page of typed alphanumeric characters.

In one embodiment, a page is scanned to capture image data, and such data is pre-processed to produce an array of character image data for the page. Character codes and corresponding confidence factors are associated with each piece of character image data for both a first orientation (e.g., the orientation provided to a scanner) and a second orientation (e.g., rotated 180 degrees from the first orientation). The character code can be determined by comparing each piece of character image data to reference data that corresponds to known characters. The closest correlation between the character image data and the reference data for one such known character identifies the character. A confidence factor can indicate the degree of confidence in the match. A high confidence factor generally indicates a close match, while a low confidence factor indicates a fairly poor match.

Each of numerous characters on a document can thus have a corresponding character code and confidence factor. Also, an array of character codes and coilfidence factors corresponding to scanned characters for each possible page orientation can be produced. Preferably, the confidence factor values are used to determine the correct page orientation, such as between a first page orientation and a second page orientation. In one embodiment, the number of confidence factor values that exceed a threshold level in each array is used to determine the correct page orientation. Thus, if the number of confidence factor values that exceed the threshold value for the second page orientation exceed the number of confidence factor values that exceed the threshold for the first page orientation, then the second page orientation is determined to be the correct one. In another embodiment, the average value for some or all of the confidence factor values in each array is used to determine the correct page orientation. Thus, for example, if the average confidence factor value corresponding to the second page orientation exceeds the average confidence factor value corresponding to the first page orientation, then the second page orientation is determined to be the correct page orientation.

An embodiment of an orientation determination module (258) includes a confidence factor values buffer (402), a comparison module (404), a reference value buffer (406), a sort module (408), and a decision module (410). The orientation determination module (258) obtains the confidence factor values that respectively correspond to the first and second page orientations from a symbol classifying module (256), and determines the proper page orientation based upon the confidence factor values. The confidence factor values buffer (402) stores and indexes the confidence factor values. The sort module (408) sorts information such as the confidence factor values, so that portions can be easily segregated and accessed for comparison. The reference value buffer (406) stores information used to make the page orientation determination, such as confidence factor value threshold levels. The comparison module (404) compares the first and second arrays of confidence factor values, such as by accessing selected values in the arrays, averaging such selected values, and/or determining whether and how many values exceed threshold levels. The decision module (410) uses the information, particularly that provided by the comparison module (404) to determine the correct or proper page orientation.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE PREFERRED EMBODIMENTS

Figure 1:
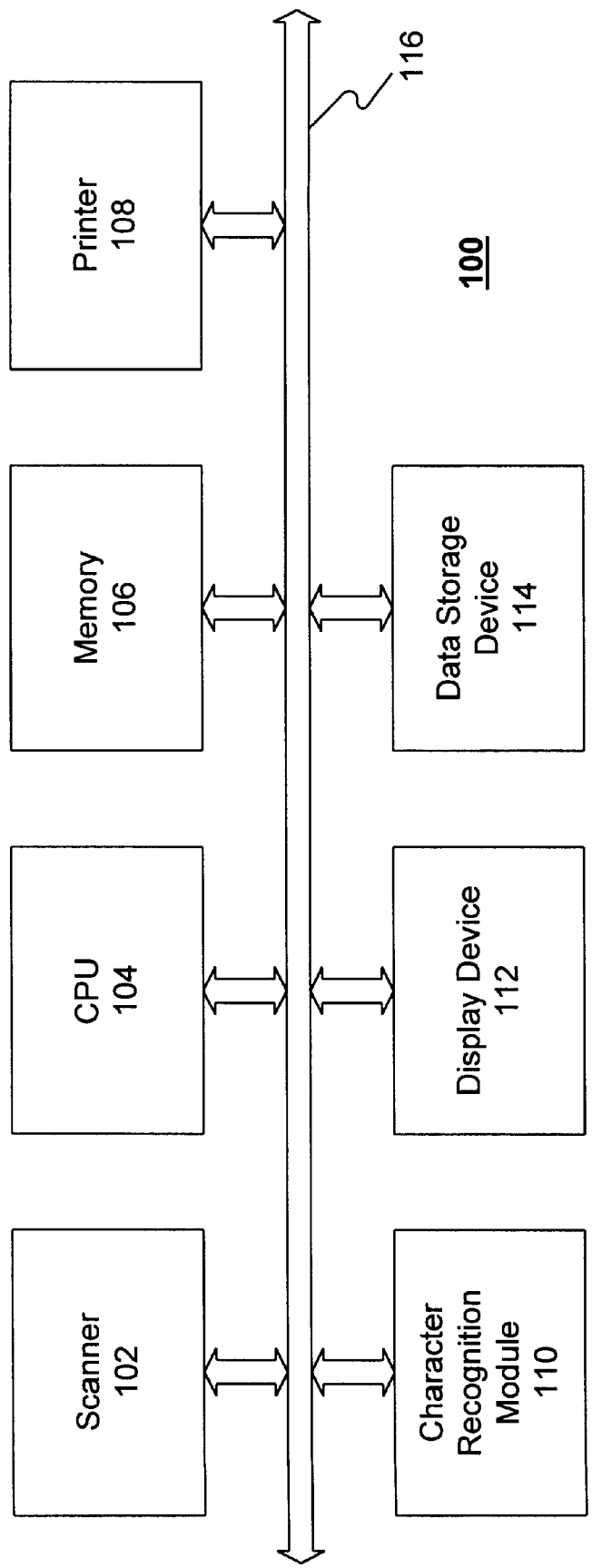
FIG. 1 is a block diagram illustrating an OCR system incorporating an embodiment of a character recognition module in accordance with the present invention.

Referring now to the block diagram of FIG. 1, an embodiment of an OCR system 100 constructed in accordance with the present invention comprises a scanner 102, CPU 104, memory 106, printer 108, character recognition module 110, display device 112, and data storage device 114 connected in a conventional architecture by a bus 116. The CPU 104 is a conventional unit for executing instructions stored in memory 106 or elsewhere, and the execution of such instructions produces the functionality within and among the various modules 102–114 described below, including the character recognition module 110.

The scanner 102 is typically an optical device that captures image data corresponding to a scanned document, such as a page of text. The scanner 102 can be a conventional image scanner such as one having a light source, optical lens, and detector. In this exemplary scanner 102, a document is provided to the scanner 102, the light source provides incident light, and the lens and detector combine to produce image data corresponding to the scanned document. Various types of detectors, such as photodiode arrays and charge coupled device (CCD) arrays can be used. Additionally, the image data can be captured in any conventional fashion, such as one-dimensionally or two-dimensionally.

The captured image data is provided to the character recognition module 110, which analyzes the captured image data and translates the captured image data into a computer format. Preferably, the character recognition module 110 produces output according to an alphanumeric encoding system, such as ASCII code. However, graphical formats could also be output. In the preferred embodiment, the character recognition module 110 receives the captured image data, segregates the captured image data according to the characters on the page to produce character image data corresponding to each character, identifies the characters corresponding to the character image data, and assigns a character code (according to an encoding system, such as ASCII) to the identified character. Although the character recognition module 110 is preferably implemented in software, it may be provided in whole or in part as hardware and/or firmware.

The display device 112 is a conventional monitor or the like, such as a CRT or flat panel display. The data storage device 114 and printer 108 are also conventional, such as a magnetic hard disk and laser jet, ink jet, or other conventional printing devices. The data produced by the character recognition module can be output to the display device 112 to visually present the scanning results, can be printed on the printer 108 to produce a hard copy, or can be stored in the data storage device 114.

Figure 2:
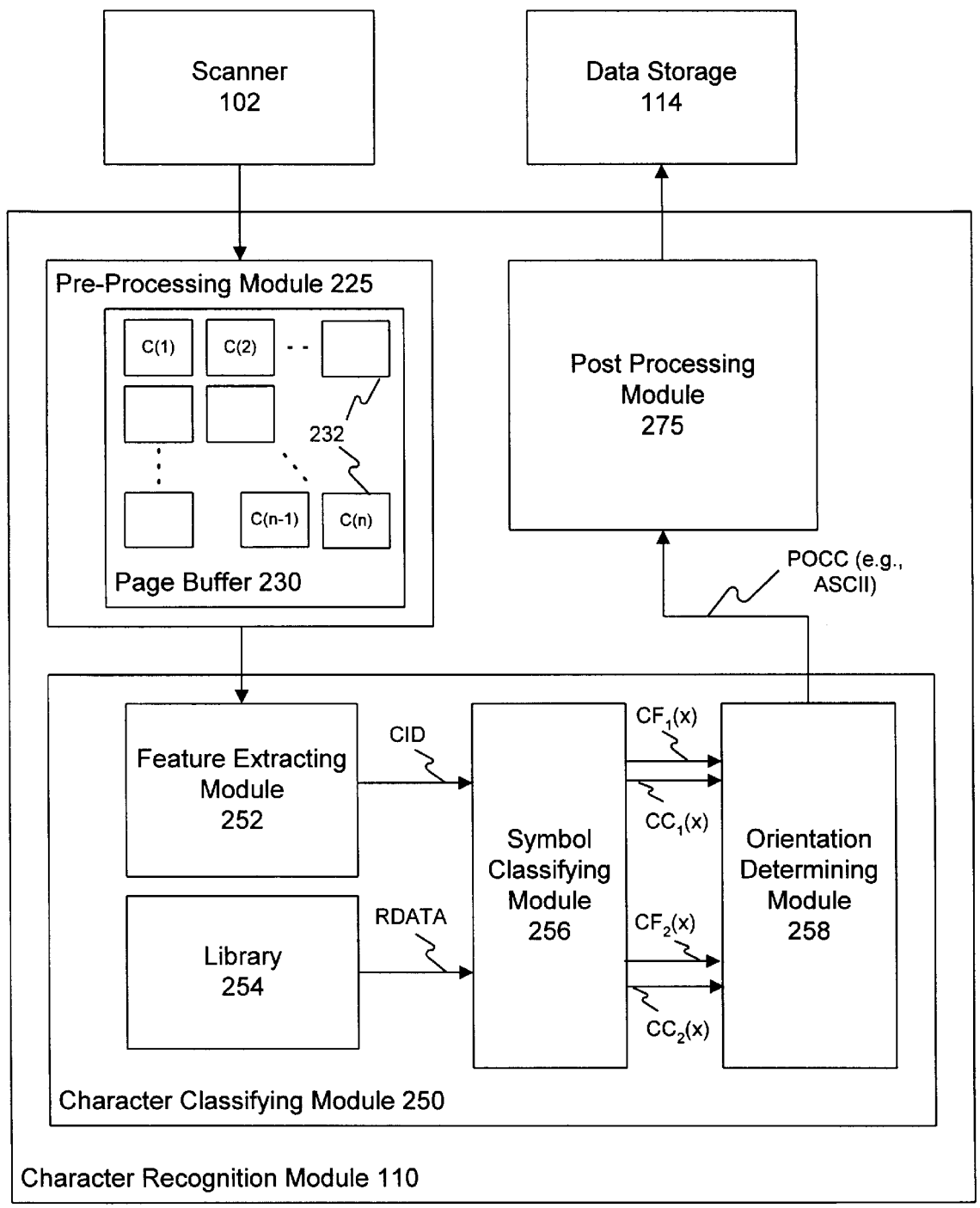
FIG. 2 is a block diagram illustrating an embodiment of a character recognition module in accordance with the present invention.

Referring to the block diagram of FIG. 2, an embodiment of a character recognition module 110 includes a pre-processing module 225, a character classifying module 250 and a post-processing module 275.

The pre-processing module 225 receives the captured image data produced by the scanner 102 and prepares the data for processing by the character recognition module 110. Preferably, the pre-processing module 225 implements conventional routines for segmenting the scanned document as necessary, and for extracting plural character images residing within the scanned document, such as those for the various alphanumeric characters on a page, as well as routines for providing the various character images in a proper format, such as a stream of pixel data. As shown in FIG. 2, a page buffer 230 can store the image data for an entire document and the symbols on the document, such as alphanumeric characters, can be extracted and provided as individual character cells 232 by the pre-processing module 225. The cells can be indexed according to any conventional technique, such as a one-dimensional or two-dimensional array representing their location on the page. In one embodiment, the characters can be indexed by storage in a FIFO buffer. FIG. 2 depicts a one dimensional array where the characters are indexed from left to right and top to bottom. Preferably, the captured image data for a scanned document is an array of pixel data, and, after extraction, each cell 232 comprises pixel data for its character. There are typically numerous individual pixels corresponding to each character.

The pixel data produced by the pre-processing module 225 is input to the feature extracting module 252, which provides character image data (CID) for processing by the symbol classifying module 256. The feature extracting module 252 can implement routines for deriving features for each character cell. Preferably, the feature extracting module 252 merely passes the pixel data for each character cell to the symbol classifying module 256 as the character image data. Alternatively, the character image data can comprise more specific features such as lines and arcs or other character elements.

In addition to character image for the scanned orientation, separate character image data for other orientations is provided to the symbol classifying module 256. This could be done by using the scanner 102 to scan the page in a second direction (e.g., top-to-bottom, then bottom-to-top). Preferably, however, the pixel data for the scanned orientation is rearranged to provide the second orientation. Thus, the preferred pre-processing module 225 includes routines for changing the orientation of the scanned document prior to segmentation and symbol extraction by re-indexing the array of pixel data corresponding to the scanned document. Specifically, if the second orientation is rotated 180 degrees from the first orientation, then the pixel data for the document is also rotated 180 degrees. Alternatively, the pre-processing module 225 and the feature extracting module 252 can include routines for processing the cells 232 of character image data to correspond to various document orientations. This can be done by re-indexing the cells 232 of character image data, as well as the pixels within each cell, to effectively provide a second page orientation. For example, for a second page orientation that is rotated 180 degrees from the original scan (first) orientation, the character image data cells can be re-indexed according to the rotation, and the pixels within each character cell can be re-mapped according to the rotation. Specifically, referring to the exemplary indexing scheme of FIG. 2, character cell C(n) from the first orientation (as shown) would be re-indexed as character cell C(1), and the pixels within that cell would also be re-mapped according to the second page orientation (i.e., for a 180 degree rotation, the pixels within the character image data would be re-mapped such that the bottom rightmost pixel would become the top leftmost pixel, etc.). Since this would be done after segmentation, it might produce less accurate results than the preferred approach. However, since the segmentation and extraction operations would not be duplicated, this alternative approach could be faster than the preferred approach.

The character image data (CID) from the feature extracting module 252 and reference data (RDATA) from library 254 are provided to the symbol classifying module 256, which determines the identity of each character by comparing the character image data to the reference data. As described above, the image data for a character preferably comprises an array of pixel data. Appropriate reference data for this type of character image data would thus also include numerous arrays of pixel data, each array corresponding to one of many known characters. The symbol classifying module 256 finds the best match between the character image data and a known character by correlating the pixels in the character image data to the reference data. The symbol classifying module 256 then associates a character code (CC), such as those provided by ASCII code, with the character according to the best match.

Typically, the correlation will not be exact. A measure of similarity, referred to as a confidence factor (CF), can be provided to quantify the confidence in the character classification, or how well the scanned character data correlates to the reference data for the matched character. The CF is proportional to the probability (P) that the determination that the scanned character corresponds to the character code is correct. The CF can also be scaled to provide a maximum value of 1 and a minimum value of 0 (Although various alternative scaling techniques could be used). Thus, a CF of 1 would represent a statistically perfect match, whereas a CF of 0 would represent a very poor match. A CF of 0.99999 could represent a recognition rate of 99,999 correct classifications per 100,000 classification attempts.

Preferably, the values for the pixel data corresponding to each individual character image and the values for the reference pixel data are gray scale values. When a document is scanned, the positioning of a scanned character relative to the scanning elements can vary or shift. Such variance can cause, for example, the scan of the same character at different page locations to produce a slightly different array of pixel data. The degree of difference depends upon factors including the size of the character and the resolution of the scan (e.g., the number of pixels per character). The positional variance can cause rough edges in the character image data. Implementation of gray scale pixel data ameliorates the differences in arrays of pixel image data for the same character, and the rough edges. Further, at least in part because of this, gray scale data typically provides a CF that closely corresponds to the probability of a correct match between the scanned character and its matched reference character. This, in turn, can provide more accurate document orientation determination using CFs, which determination is described further below. Although gray scale is preferred, bi-level pixel data or any character image data can alternatively be used.

Since character image data is provided for multiple page orientations, the symbol classifying module 256 provides an array of character codes and corresponding confidence factors for a first page orientation ($CC_1(x)$, $CF_1(x)$) and a second page orientation ($CC_2(x)$, $CF_2(x)$) to the orientation determination module 258, which preferably uses the confidence factor values for the first and second page orientations to determine the correct page orientation, and provides the appropriate character codes to the post-processing module 275 based upon the determination. For example, if the first page orientation is determined to be the correct page orientation, then the first array of character codes are provided to the post-processing module 275, whereas if the second page orientation (e.g., rotated 180 degrees) is determined to be correct, then the second array of character codes are provided. The character codes corresponding to the correct page orientation can be referred to as page oriented character codes (POCCs).

The post-processing module 275 includes conventional routines, such as spell checking routines, which may be used to verify (and possibly provide information to correct) incorrect character classification decisions. Finally, the character codes can be compiled and displayed, stored (such as is shown in FIG. 2) or processed in any conventional fashion.

Figure 7:
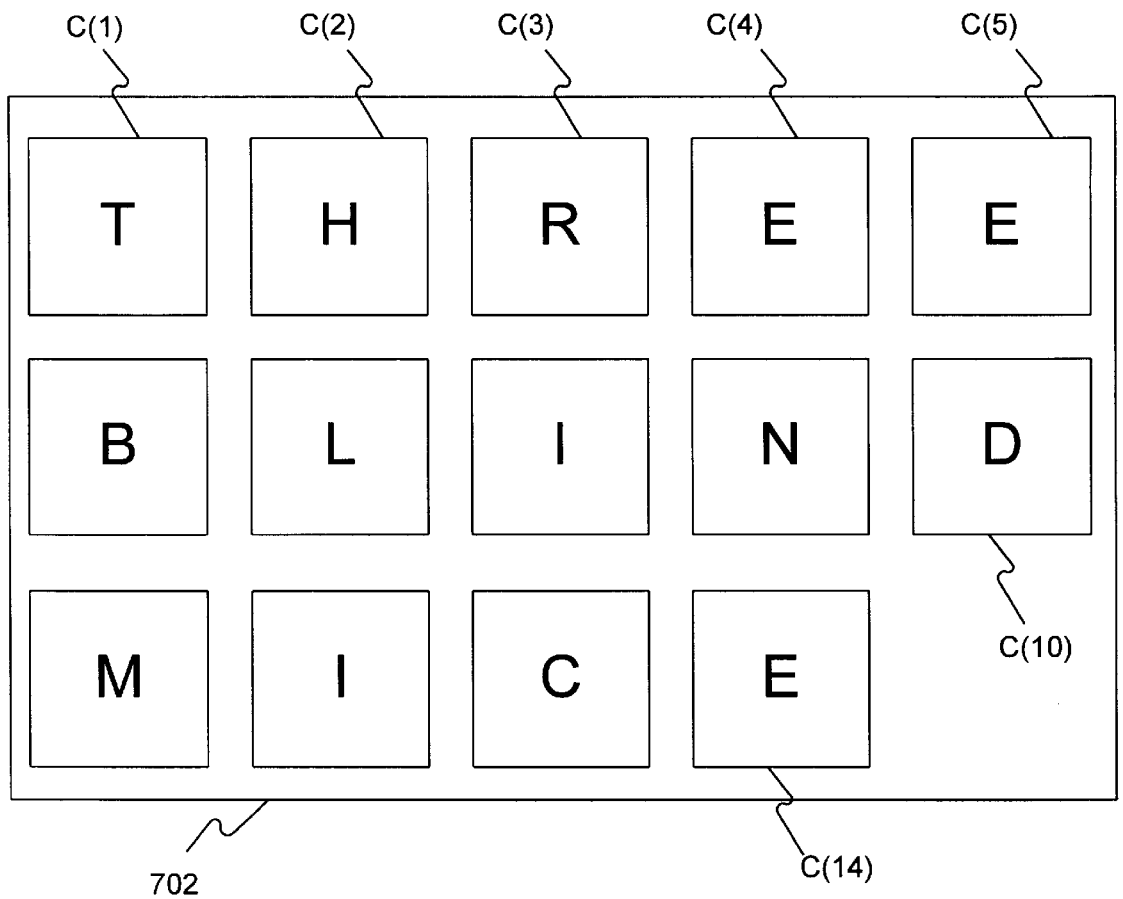
FIG. 7 is an exemplary page of characters in a first orientation that can be scanned and subject to orientation determination in accordance with the present invention.
Figure 8:
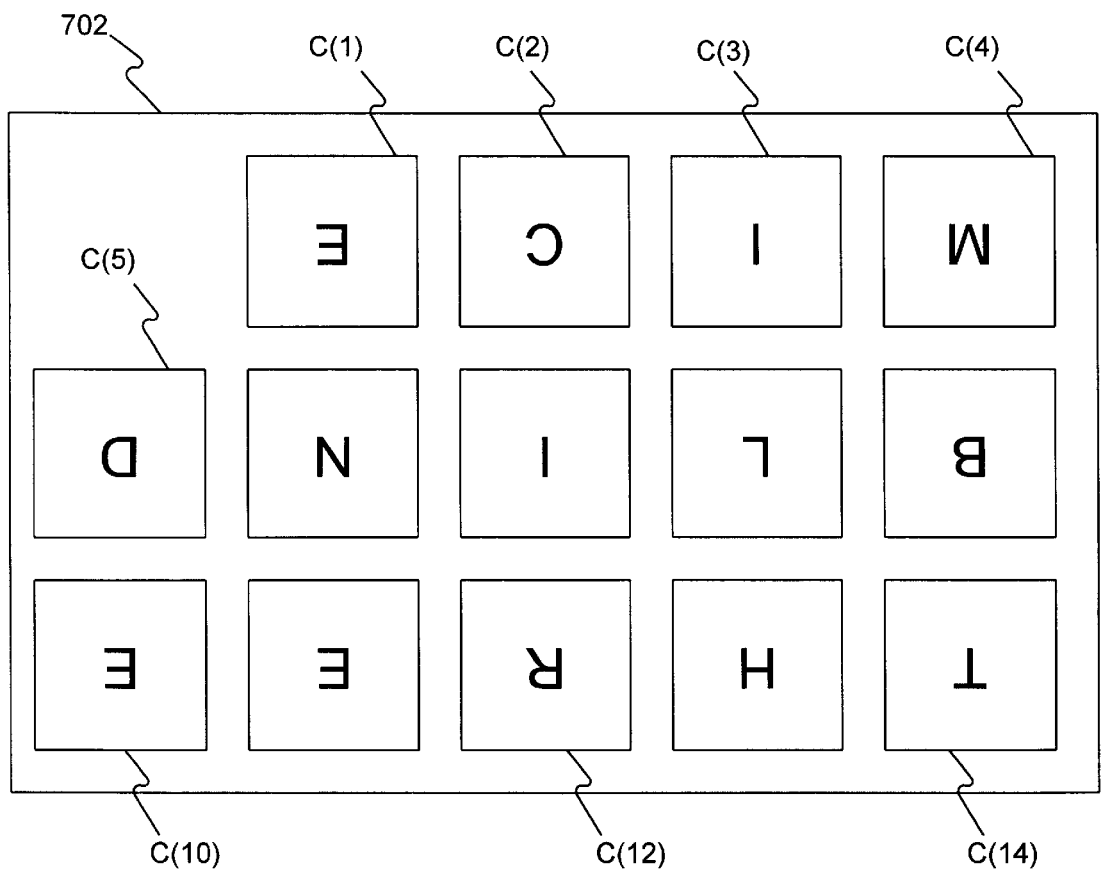
FIG. 8 is the exemplary page of characters of FIG. 7, rotated 180 degrees to provide a second orientation.

Referring now to the schematic diagrams of FIGS. 7 and 8, an exemplary page 702 in a first orientation (FIG. 7) and a second orientation (FIG. 8) is shown to illustrate such orientations and, in conjunction with Tables 1 and 2 below, the information that could be obtained by the OCR system. The exemplary page 702 includes an array of characters (indexed as characters C(1)–C(14)). In the first orientation, the characters indicate the phrase "THREE BLIND MICE." The second orientation illustrates the same exemplary page 702 rotated 180 degrees from the first orientation. It also includes an array of characters, which could also be indexed by the same scheme (top to bottom, left to right).

Tables 1 and 2 respectively inidicate possible candidate character codes (shown alphanumerically, rather than in ASCII format for illustration purposes) and their corresponding confidence factor values produced by the symbol classifying module 256. It is noted that the confidence factor values are merely provided to illustrate the functionality of page orientation determination, and that actual confidence factor values can and will reflect much greater scanning precision. Table 1 illustrates possible candidate character codes for the orientation shown in FIG. 7. As is evident from the table, the character codes (the shown alphanumeric equivalent of them) correspond to the text on the page. Table 2 illustrates possible candidate character codes produced by scanning the page in the orientation shown in FIG. 8 (Upside Down). As is evident, some of the characters are incorrectly identified in Table 2, as the page would be scanned upside down, and classification assumes proper orientation. Additionally, the confidence factors corresponding to the first orientation (Table 1) are generally higher than the confidence factors for the second orientation.

TABLE 1

| Index x | Character Code $CC_1(x)$ | Confidence Factor $CF_1(x)$ |
| --- | --- | --- |
| 1 | T | .96 |
| 2 | H | .97 |
| 3 | R | .94 |
| 4 | E | .97 |
| 5 | E | .97 |
| 6 | B | .93 |
| 7 | L | .92 |
| 8 | I | .95 |
| 9 | N | .99 |
| 10 | D | .98 |
| 11 | M | .97 |
| 12 | I | .95 |
| 13 | C | .94 |
| 14 | E | .97 |

TABLE 2

| Index x | Character Code $CC_2(x)$ | Confidence Factor $CF_2(x)$ |
| --- | --- | --- |
| 1 | 3 | .89 |
| 2 | O | .80 |
| 3 | I | .95 |
| 4 | W | .88 |

TABLE 2-continued

| Index x | Character Code $CC_2(x)$ | Confidence Factor $CF_2(x)$ |
|---|---|---|
| 5 | O | .80 |
| 6 | N | .99 |
| 7 | I | .95 |
| 8 | 7 | .85 |
| 9 | B | .82 |
| 10 | 3 | .89 |
| 11 | 3 | .89 |
| 12 | B | .65 |
| 13 | H | .97 |
| 14 | L | .80 |

Figure 3:
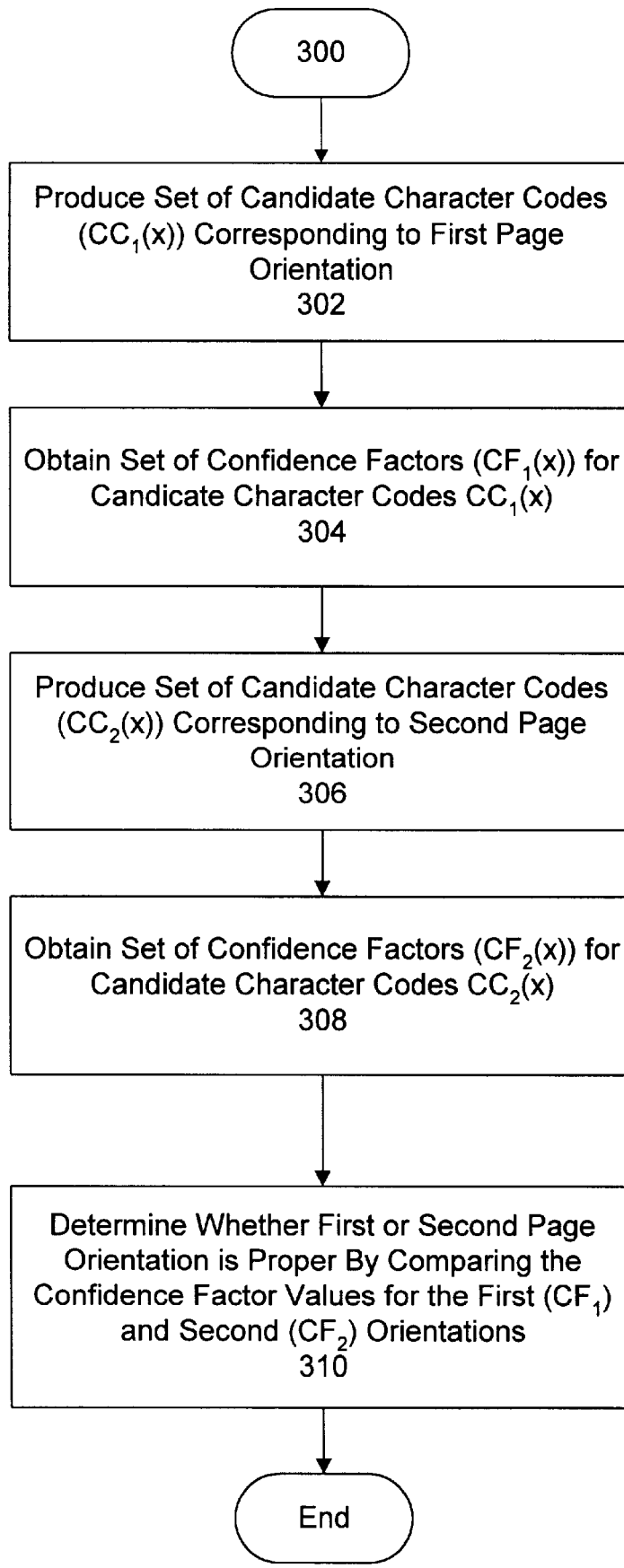
FIG. 3 is a flow chart illustrating an embodiment of a method for determining proper page orientation implemented by the character recognition module in accordance with the present invention.

Referring now to the flow chart of FIG. 3, an embodiment of a method 300 implemented by the character recognition module 110 for determining the correct orientation of a scanned page is illustrated. In step 302, an array or set of character codes corresponding to the first page orientation is produced. This is done by scanning the page according to the orientation in which it is provided to the scanner 102, preprocessing the captured image data to segregate the character image data, performing any necessary feature extraction, and classifying the character image data, such as by comparison to reference character image data, to assign a candidate character code to each character image. In step 304, an array of confidence factor values are obtained for the candidate character codes. As indicated above, the confidence factor values can be produced at the time of classification, based upon the degree of similarity between the character image data and reference data. Similarly, in steps 306 and 308, an array of candidate character codes and corresponding confidence factors are produced. In one embodiment, steps 302 through 308 can be performed by the symbol classifying module 256 using data provided by the scanner 102, preprocessing module 225, feature extracting module 252 and library 254, as described above. Finally, in step 310, the proper page orientation is determined by comparing the confidence factor values corresponding to the first and second orientations. This step 310 can be performed by the orientation determination module 258.

Figure 4:
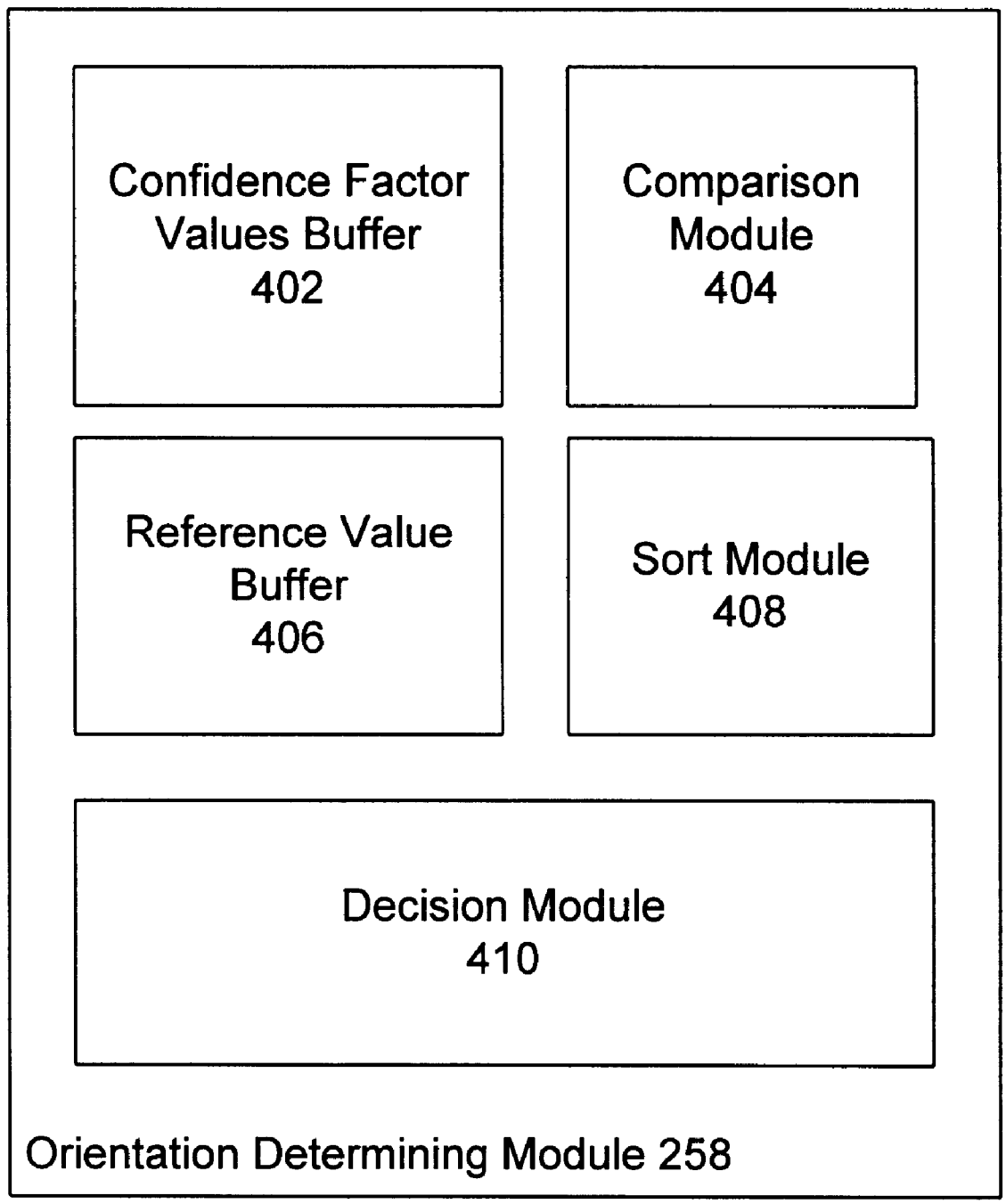
FIG. 4 is a block diagram illustrating an embodiment of an orientation determination module in accordance with the present invention.
Figure 5:
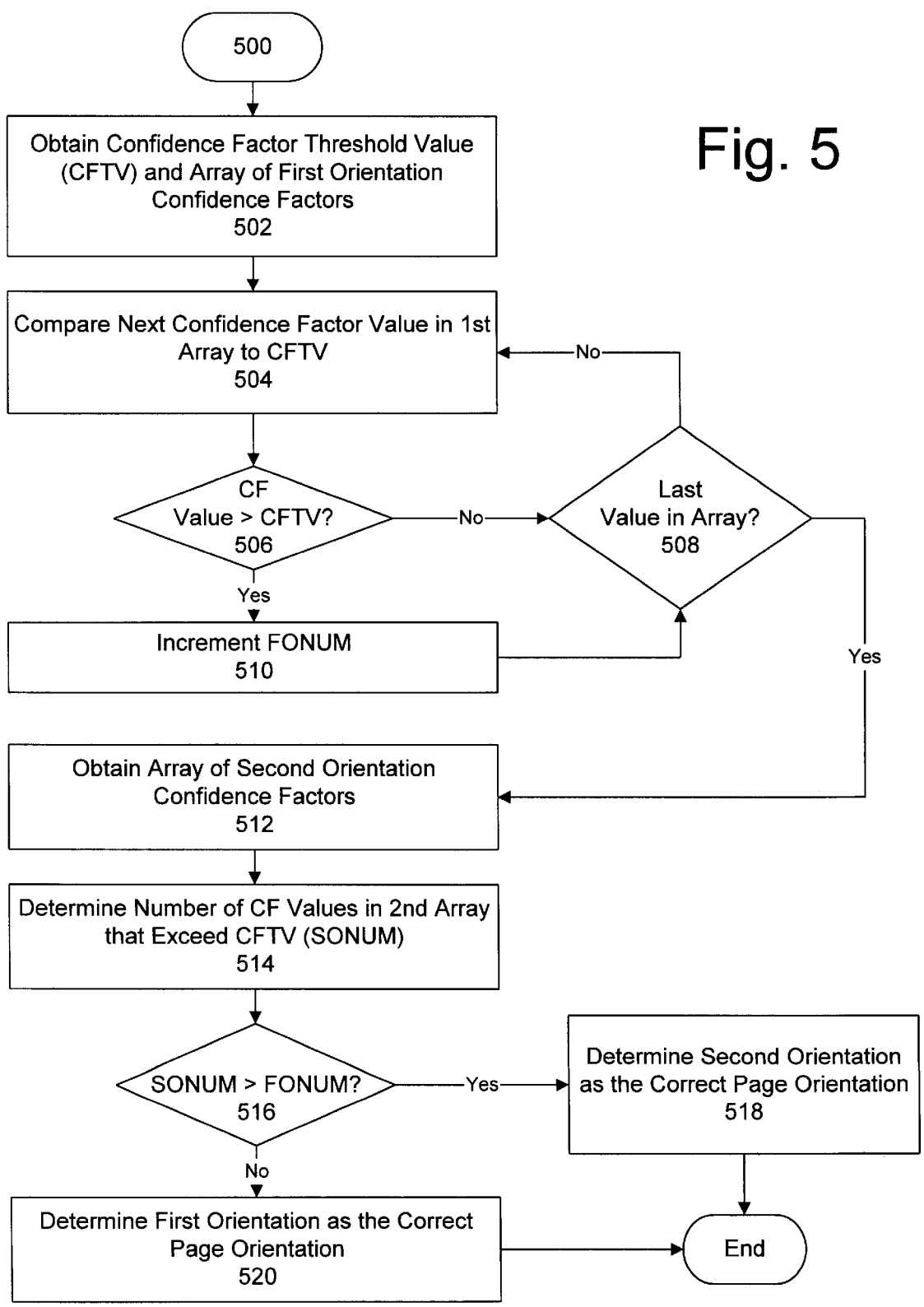
FIG. 5 is a flow chart illustrating another embodiment of a method for determining proper page orientation implemented by the character recognition module in accordance with the present invention.
Figure 6:
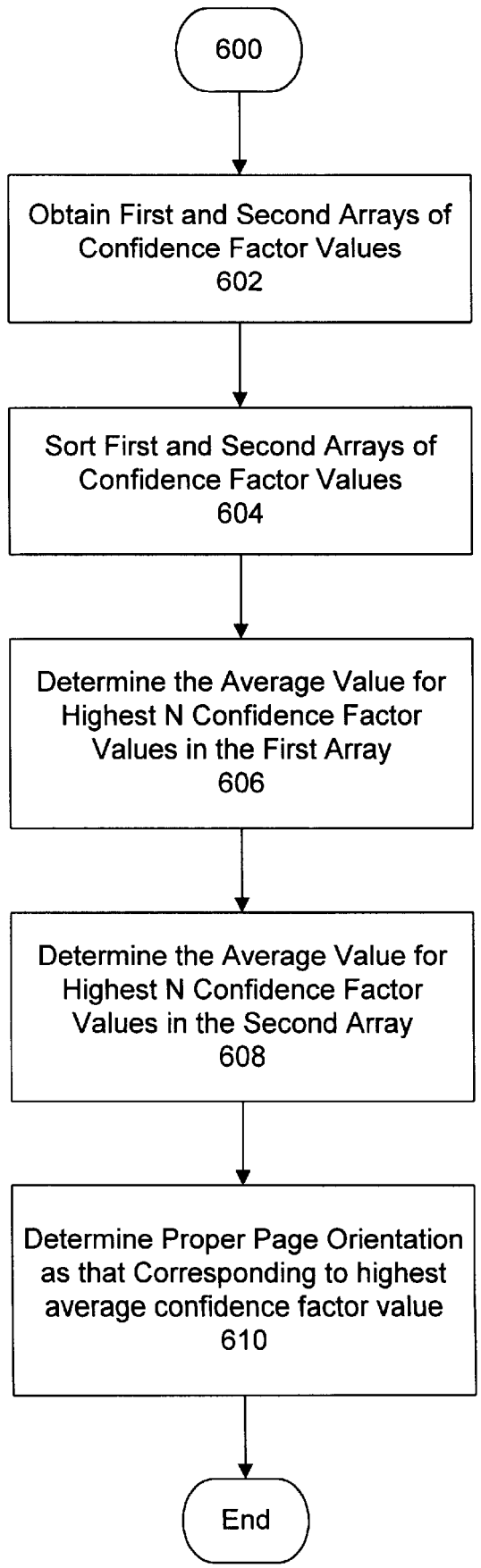
FIG. 6 is a flow chart illustrating yet another embodiment of a method for determining proper page orientation implemented by the character recognition module in accordance with the present invention.

Referring now to the block diagram of FIG. 4, an embodiment of an orientation determination module 258 in accordance with the present invention comprises a confidence factor values buffer 402, a comparison module 404, a reference value buffer 406, a sort module 408 and a decision module 410. Basically, the orientation determination module 258 obtains the first and second sets of confidence factor values that respectively correspond to the first and second page orientations, and determines the proper page orientation based upon those confidence factor values. The confidence factor values buffer 402 stores the confidence factor values, such as in a conventional data table, where the array of values are indexed, preferably according to same indexing scheme provided for the character image data. The sort module 408 includes conventional routines for sorting information, such as that in the confidence factor values buffer 402. Thus, for example, the values in the first and second arrays of confidence factor values can be sorted, such that portions of each array can be easily segregated and accessed for comparison. The reference value buffer 406 stores information used to make the page orientation determination, such as confidence factor value threshold levels. The comparison module 404 includes routines used to compare the first and second arrays of confidence factor values, such as those for accessing selected values in the confidence factor arrays, averaging confidence factor values in the arrays, and/or determining whether and how many values exceed threshold levels. Finally, the decision module 410 accesses the information provided by the comparison module 404 and the confidence factor values buffer 402 to determine the proper page orientation. The functionality of the orientation determination module 258 is understood further with reference to the embodiments for page orientation determination described with reference to FIGS. 5 and 6. Additionally, to illustrate such functionality, reference is made to the exemplary values provided for the first and second orientations in Tables 1 and 2.

In one embodiment, the orientation determination module 258 determines the proper page orientation as that which has the most corresponding confidence factor values that exceed a predetermined threshold. Referring now to the flow chart of FIG. 5 along with the exemplary data provided in Tables 1 and 2 above, according to this embodiment, in step 502, the confidence factor threshold value (CFTV) and the array of first orientation confidence factors ($CF_1$) are obtained so that the values in the first array can be compared to the threshold value CFTV in step 504. Assuming that CFTV is 0.94, it is determined whether each value in the array exceeds CFTV in steps 504, 506, 508 and the amount of values exceeding the CFTV are determined by analyzing each confidence factor value (step 506) and incrementing counter FONUM in step 510 until the last value is analyzed in step 508. Referring to the first page orientation exemplary data in Table 1, ten of the confidence factor values $CF_1(x)$ exceed the exemplary threshold value CFTV of 0.94, so FONUM=10. Next, the second page orientation confidence factor values $CF_2$ are obtained in step 512 and the amount of those values that exceed CFTV are determined in step 514. Referring to the second page orientation exemplary data in Table 2, four of the confidence factor values $CF_2(x)$ exceed CFTV, so SONUM=4. In step 516, it is determined whether SONUM exceeds FONUM. If so, then it is determined in step 518 that the second orientation is the correct page orientation. If not, then it is determined in step 520 that the first orientation is the correct page orientation. In the described example, SONUM does not exceed FONUM, so it would be determined that the first orientation (FIG. 7), rather than the second orientation (FIG. 8) was the correct page orientation.

In other embodiments, the orientation determination module 258 determines the correct page orientation by averaging some or all of the confidence factor values corresponding to each candidate orientation. Referring now to the flow chart of FIG. 6, another embodiment of orientation determination implemented by the orientation determination module 258 implements confidence factor averaging. In step 602, the first $CF_1(x)$ and second $CF_2(x)$ arrays of confidence factor values are obtained. Then, in step 604, the values in the respective arrays are sorted so that selected values in each array can be easily accessed. A subset of confidence factor values, such as the highest N values in the first array $CF_1(x)$ are accessed, and the average of those values are then determined in step 606. Similarly, the average value for the highest N confidence factor values in the second array $CF_2(x)$ are determined in step 608.

For example, the exemplary data tables 1 and 2 could produce the following data table 3 having the highest ten confidence factor values and corresponding average for each of first and second orientations.

TABLE 3

| Orig. Index x | CF₁(x) Value | Orig. Index x | CF₂(x) Value |
|---|---|---|---|
| 9 | .99 | 6 | .99 |
| 10 | .98 | 13 | .97 |
| 2 | .97 | 3 | .95 |
| 4 | .97 | 7 | .95 |
| 5 | .97 | 1 | .89 |
| 11 | .97 | 10 | .89 |
| 14 | .97 | 11 | .89 |
| 1 | .96 | 4 | .88 |
| 8 | .95 | 8 | .85 |
| 12 | .95 | 9 | .82 |
| Average = | 0.97 | Average = | 0.91 |

As indicated in Table 3, the average of the highest ten confidence factor values corresponding to the first page orientation is 0.97, while the average confidence factor value for the similar subset corresponding to the second page orientation is 0.91.

In step 610, the correct page orientation is determined to be the one corresponding to the highest average confidence factor value. Again referring to the exemplary data, the higher average confidence factor value of 0.97 for the first orientation dictates that it, and not the second orientation, is the correct page orientation.

In one embodiment, step 602 is performed by receiving the first and second confidence factor values into the confidence factor values buffer 402. These value can be sorted by the sort module 408, and then the comparison module 404 and reference value buffer 406 can combine to identify the highest N values and average them for steps 606 and 608. Finally, the decision module 410 can determine the correct page orientation by determining whether the average value for the selected second orientation confidence factors exceeds that for the first orientation.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer implemented method for determining the correct orientation of a scanned page of alphanumeric characters having a plurality of alphanumeric characters, the method comprising:

receiving captured image data corresponding to a first orientation for a page, the first orientation corresponding to the orientation in which the page is provided to a scanner;

identifying a first set of candidate character codes that correspond to characters from the page according to the first orientation;

associating a confidence factor with each candidate character code from the first set of candidate character codes to produce a first set of confidence factors;

producing a second set of candidate character codes that correspond to characters from the page according to a second orientation;

associating a confidence factor with each candidate character code from the second set of candidate character codes to produce a second set of confidence factors;

determining the number of confidence factor values in the first set of confidence factors that exceed a predetermined value;

determining the number of confidence factor values in the second set of confidence factors that exceed the predetermined value; and determining that the correct page orientation is the first orientation when the number of confidence factors in the first set of confidence factors that exceeds the predetermined value is higher than the number of confidence factors in the second set of confidence factors that exceeds the predetermined value.

2. A computer implemented method for determining the correct orientation of a scanned page of alphanumeric characters having a plurality of alphanumeric characters, the method comprising:

receiving captured image data corresponding to a first orientation for a page, the first orientation corresponding to the orientation in which the page is provided to a scanner;

identifying a first set of candidate character codes that correspond to characters from the page according to the first orientation;

associating a confidence factor with each candidate character code from the first set of candidate character codes to produce a first set of confidence factors;

producing a second set of candidate character codes that correspond to characters from the page according to a second orientation;

associating a confidence factor with each candidate character code from the second set of candidate character codes to produce a second set of confidence factors;

determining the average of the confidence factor values in the first set of confidence factors;

determining the average of the confidence factor values in the second set of confidence factors; and determining that the correct page orientation is the second orientation when the average of the confidence factor values in the second set of confidence factors exceeds the average of the confidence factor values in the first set of confidence factor values.

3. A computer implemented method for determining the correct orientation of a scanned page of alphanumeric characters having a plurality of alphanumeric characters, the method comprising:

receiving captured image data corresponding to a first orientation for a page, the first orientation corresponding to the orientation in which the page is provided to a scanner;

identifying a first set of candidate character codes that correspond to characters from the page according to the first orientation;

associating a confidence factor with each candidate character code from the first set of candidate character codes to produce a first set of confidence factors;

producing a second set of candidate character codes that correspond to characters from the page according to a second orientation;

associating a confidence factor with each candidate character code from the second set of candidate character codes to produce a second set of confidence factors;

obtaining a first subset of values, selected from the first set of confidence factor values, and determining the average value in the first subset;

obtaining a second subset of values, selected from the second set of confidence factor values, and determining the average value in the second subset; and determining that the correct page orientation is the second orientation when the average value in the second subset exceeds the average value in the first subset.

4. The method of claim 1, wherein the candidate character codes are identified by correlating gray scale pixel data from the captured image data to reference pixel data.

5. The method of claim 4, wherein the candidate character codes are ASCII code values.

6. A computer readable medium containing a computer program that determines the correct orientation of scanned page of alphanumeric characters having a plurality of alphanumeric characters and includes routines for:

receiving captured image data corresponding to a first orientation for a page, the first orientation corresponding to the orientation in which the page is provided to a scanner;

identifying a first set of candidate character codes that correspond to characters from the page according to the first orientation;

associating a confidence factor with each candidate character code from the first set of candidate character codes to produce a first set of confidence factors;

producing a second set of candidate character codes that correspond to characters from the page according to a second orientation;

associating a confidence factor with each candidate character code from the second set of candidate character codes to produce a second set of confidence factors;

determining the number of confidence factor values in the first set of confidence factors that exceed a predetermined value;

determining the number of confidence factor values in the second set of confidence factors that exceed the predetermined value; and determining that the correct page orientation is the first orientation when the number of confidence factors in the first set of confidence factors that exceeds the predetermined value is higher than the number of confidence factors in the second set of confidence factors that exceeds the predetermined value.

7. A computer readable medium containing a computer program that determines the correct orientation of a scanned page of alphanumeric characters having a plurality of alphanumeric characters and includes routines for:

receiving captured image data corresponding to a first orientation for a page, the first orientation corresponding to the orientation in which the page is provided to a scanner;

identifying a first set of candidate character codes that correspond to symbols from the page according to the first orientation;

associating a confidence factor with each candidate character code from the first set of candidate character codes to produce a first set of confidence factors;

producing a second set of candidate character codes that correspond to characters from the page according to a second orientation;

associating a confidence factor with each candidate symbol code from the second set of candidate symbol codes to produce a second set of confidence factors;

determining the average of the confidence factor values in the first set of confidence factors;

determining the average of the confidence factor values in the second set of confidence factors; and determining that the correct page orientation is the second orientation when the average of the confidence factor values in the second set of confidence factors exceeds the average of the confidence factor values in the first set of confidence factor values.

8. A computer readable medium containing a computer program that determines the correct orientation of a scanned page of alphanumeric characters having a plurality of alphanumeric characters and includes routines for:

receiving captured image data corresponding to a first orientation for a page, the first orientation corresponding to the orientation in which the page is provided to a scanner;

identifying a first set of candidate character codes that correspond to characters from the page according to the first orientation;

associating a confidence factor with each candidate character code from the first set of candidate character codes to produce a first set of confidence factors;

producing a second set of candidate character codes that correspond to characters from the page according to a second orientation;

associating a confidence factor with each candidate character code from the second set of candidate character codes to produce a second set of confidence factors;

obtaining a first subset of values, selected from the first set of confidence factor values, and determining the average value in the first subset;

obtaining a second subset of values, selected from the second set of confidence factor values, and determining the average value in the second subset; and determining that the correct page orientation is the second orientation when the average value in the second subset exceeds the average value in the first subset.

9. The computer readable medium containing a computer program of claim 6, wherein the candidate character codes are identified by correlating gray scale pixel data from the captured image data to reference pixel data.

10. A character recognition apparatus for determining the correct orientation of a scanned page of alphanumeric characteristics having a plurality of alphanumeric characters, the apparatus comprising:

a pre-processing module, for receiving captured image data corresponding to a first orientation for a page, the first orientation corresponding to the orientation in which the page is provided to a scanner;

a character classifying module, coupled to the pre-processing module, for identifying a first set of candidate character codes that correspond to characters from the page according to the first orientation, associating a confidence factor with each candidate character code from the first set of candidate character codes to produce a first set of confidence factors, producing a second set of candidate character codes that correspond to characters from the page according to a second orientation, and associating a confidence factor with each candidate character code from the second set of candidate character codes to produce a second set of confidence factors; and an orientation determination module coupled to the character classifying module, the orientation determination module, determining the number of confidence factor values in the first set of confidence factors that exceed a predetermined value;

determining the number of confidence factor values in the second set of confidence factors that exceed the predetermined value; and determining that the correct page orientation is the first orientation when the number of confidence factors in the first set of confidence factors that exceeds the predetermined value is higher than the number of confidence factors in the second set of confidence factors that exceeds the predetermined value.

11. A character recognition apparatus for determining the correct orientation of a scanned page of alphanumeric characters having a plurality of alphanumeric characters, the apparatus comprising:

a pre-processing module, for receiving captured image data corresponding to a first orientation for a page, the first orientation corresponding to the orientation in which the page is provided to a scanner;

a character classifying module, coupled to the pre-processing module, for identifying a first set of candidate character codes that correspond to characters from the page according to the first orientation, associating a confidence factor with each candidate character code from the first set of candidate character codes to produce a first set of confidence factors, producing a second set of candidate character codes that correspond to characters from the page according to a second orientation, and associating a confidence factor with each candidate character code from the second set of candidate character codes to produce a second set of confidence factors; and an orientation determination module coupled to the character classifying module, the orientation determination module, determining the average of the confidence factor values in the first set of confidence factors;

determining the average of the confidence factor values in the second set of confidence factors; and determining that the correct page orientation is the second orientation when the average of the confidence factor values in the second set of confidence factors exceeds the average of the confidence factor values in the first set of confidence factor values.

12. A character recognition apparatus for determining the correct orientation of a scanned page of alphanumeric characters having a plurality of alphanumeric characters, the apparatus comprising:

a pre-processing module, for receiving captured image data corresponding to a first orientation for a page, the first orientation corresponding to the orientation in which the page is provided to a scanner;

a character classifying module, coupled to the pre-processing module, for identifying a first set of candidate character codes that correspond to characters from the page according to the first orientation, associating a confidence factor with each candidate character code from the first set of candidate character codes to produce a first set of confidence factors, producing a second set of candidate character codes that correspond to characters from the page according to a second orientation, and associating a confidence factor with each candidate character code from the second set of candidate character codes to produce a second set of confidence factors; and an orientation determination module coupled to the character classifying module, the orientation determination module, obtaining a first subset of values, selected from the first set of confidence factor values, and determining the average value in the first subset;

obtaining a second subset of values, selected from the second set of confidence factor values, and determining the average value in the second subset; and determining that the correct page orientation is the second orientation when the average value in the second subset exceeds the average value in the first subset.

13. The apparatus of claim 10, wherein the candidate character codes are identified by correlating gray scale pixel data from the captured image data to reference pixel data.

14. The apparatus of claim 13, wherein the candidate character codes are ASCII code values.

* * * * *

UNITED STATES PATENT AND TRADEMARK OFFICE
CERTIFICATE OF CORRECTION

PATENT NO. : 6,151,423

DATED : November 21, 2000

INVENTOR : Roger D. Melen

It is certified that error appears in the above-identified patent and that said Letters Patent is hereby corrected as shown below:

In column 10, line 66, delete "detennining" and insert --determining--.

Signed and Sealed this

Twenty-second Day of May, 2001

Attest:

NICHOLAS P. GODICI

Attesting Officer

Acting Director of the United States Patent and Trademark Office